2,987,496
COLORANTS FOR RESINS
James E. Simpson, Berea, Ohio, assignor to Ferro Corporation, Cleveland, Ohio, a corporation of Ohio
No Drawing. Filed Aug. 23, 1960, Ser. No. 51,278
3 Claims. (Cl. 260—40)

This invention relates as indicated to the coloring of resins and has more particular reference to a composition and method for producing colored speckled effects in resin bodies.

The pigmentation and dyeing of various resins is old and well known to those skilled in the art as is the production of streaked effects in resin bodies. However, the production of variously colored speckled effects in resins has been relatively unsuccessful until the present invention. This was due to the fact that pigments and dyes, whether they are organic or inorganic, were either too small in particle size and the particle size could not be readily controlled or they were soluble in the resin body with which they were used.

It is the principal object of the present invention to provide novel colorants for producing speckled effects in resin bodies which colorants are substantially insoluble in the resin bodies and in which the particle size of such colorants can be readily controlled.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the method of producing a hard and substantially infusible colorant which comprises intimately admixing a polymerizable thermosetting resin and a pigment, causing said admixture to undergo polymerization into a hard and substantially infusible mass, and then pulverizing said polymerized mass to a predetermined particle size.

For the purposes of this invention a thermosetting resin is one that under the application of heat or a catalyst polymerizes into a hard, substantially infusible product which will not soften to any extent on reheating and cannot be remelted. Such thermosetting materials as phenol or cresol formaldehydes, urea formaldehydes, melamine-formaldehyde, aniline formaldehyde and polyester resins will be found to be particularly useful in the present invention.

As for the pigment of the present invention, this can be any organic or inorganic pigment or dye.

The colorant of the foregoing broadly stated paragraph after polymerization can be reduced to a predetermined particle size by any of the well known milling or grinding equipment such as ball mills, hammer mills, crushers and micro pulverizers. This colorant is then usable in either thermosetting or thermoplastic resins to produce the desired speckled effect.

As illustrative of the several ways in which the process of the present invention may be carried out, reference may be had to the following examples:

*Example I*

| | Percent |
|---|---|
| Polyester resin (i.e. diethylene glycol-phthalate-maleate) | 90 |
| Pigment (cadmium sulfo-selenide red) | 10 |

The above ingredients were thoroughly admixed and a suitable air-curing catalyst (i.e. benzoyl peroxide) added thereto. The admixture was then allowed to air-cure into a hard substantially infusible mass. The hardened mass was then reduced to a particle size of about 40–80 mesh.

One part of the colorant was then admixed with 100 parts of polyvinyl chloride resin. The mixture was then molded into a tile having a red speckled effect.

*Example II*

| | Percent |
|---|---|
| Urea formaldehyde | 95 |
| Pigment (cobalt-silicate blue) | 5 |

The above ingredients were thoroughly admixed and then heated to a hard substantially infusible mass. The hardened mass was then ground in a micro-pulverizer to a particle size of about 80–100 mesh.

This colorant when incorporated in polystyrene produced a blue speckled effect.

*Example III*

| | Percent |
|---|---|
| Polyester resin (such as shown in Example I above) | 97 |
| Pigment (i.e., phthalocyanine blue) | 3 |

The above ingredients were processed as in Example I above.

The colorant when incorporated in melamine-formaldehyde resin produced a green speckled effect.

Polyesters useful in accordance herewith are three dimensional esters produced from one or more polyfunctional acids and alcohols, such as phthalic, isophthalic, terephthalic, itaconic, citraconic, maleic, fumaric, sebacic, succinic, adipic, etc. with one or more polyhydric alcohols such as glycerol, pentaerythritol, propylene glycol, ethylene glycol, trimethylol ethane, diethylene glycol, etc. These esters may upon polymerization be "modified" with a number of co-polymerizable materials including styrene, vinyl toluene, vinyl acetate, methyl methacrylate, acrylonitrile, acrylic acid, etc. In general, these polyesters are made from one mole of the dibasic carboxylic acid, or mixture of two or more dibasic carboxylic acids, and a slight stoichiometric excess of the polyhydric component over that required to satisfy all the carboxylic acid content. The esterification is conventional and is usually carried out in a temperature range of from about 325° F. to about 400° F. with the removal of water, over a period of 6 to 18 hours to yield a polyester having an acid value in the range of from about 25 to about 80. Specific polyesters include the following, any of which may be used in place of that given in Examples I–III above to produce the colorants of this invention: fumaric acid/phthalic anhydride/propylene glycol (.5:.5:1.1); maleic anhydride/phthalic anhydride/diethylene glycol (.5:.5:1.1); fumaric acid/hexamethylene glycol (1:1.1); maleic anhydride/isophthalic acid/tetramethylene glycol (1:1:2.1); maleic anhydride/terephthalic acid/propylene glycol (0.75:0.25:1.1); fumaric acid/adipic acid/propylene glycol (0.5:0.5:1.1); itaconic acid/phthalic anhydride/propylene glycol (0.75:0.25:1.1); fumaric acid/sebacic acid/ethylene glycol (0.5:0.5:1.1); etc.

As previously stated the colorants of the present invention can be produced from any of the well known thermosetting resins and organic or inorganic pigments and dyes. The amount of pigment material admixed with thermosetting resin is substantially determined by the tinting strength of the pigment used and the strength of color desired in the finished colorant. Amounts of from about 0.1% to about 10% pigment will usually be found desirable.

The colorants of the present invention can be used to produce a speckled effect in any of the well known commercial colored or colorless thermosetting and thermoplastic resins. The amount of colorant used being dependent on the amount of speckle desired in the finished product. Amounts of from about 0.1% to about 10% colorant will usually be found desirable.

In addition to the solid resins specifically exemplified above, other solid resinous materials which may be compounded with the colorants of the present invention include epoxy resins, phenol-formaldehyde resins, nylon, glyceryl phthalate, poly (vinyl chloride-vinyl acetate), cellulose acetate, poly (vinyl butyral), cellulose nitrate, ethyl cellulose, cellulose acetate-butyrate, polyethylene, poly (vinylidene chloride), poly (vinylidene-vinyl chloride), poly (tetrafluoroethylene), poly (methyl methacrylate), poly (butadiene-styrene), and the like. Other ingredients may be included in these solid resins, such as plasticizers, stabilizers, extenders, fillers, pigments, etc. in the conventional manner of employment of such materials in these resins.

This application is a continuation in part of my copending application Serial No. 668,854, filed July 1, 1957, now abandoned in favor of this application.

Other modes of applying the principle of the invention may be employed, change being made as regards the details described, provided the features stated in any of the following claims or the equivalent of such be employed.

It is, therefore, particularly pointed out and distinctly claimed as the invention:

1. The method of producing a hard and substantially infusible colorant which comprises intimately admixing from about 99.9% to 80% of an unpolymerized thermosetting polyester with from about 0.1% to about 20% of a pigment, adding a catalyst to polymerize said admixture into a hard and substantially infusible resinous mass, and then pulverizing said mass to a particle size of from 40–100 mesh.

2. The method of producing a speckled effect in a solid resin which comprises intimately admixing from about 99.9% to about 80% of an unpolymerized thermosetting polyester with from about 0.1% to about 20% of a pigment, adding a catalyst to polymerize said polyester to a hard and substantially infusible resinous mass, pulverizing said mass to a particle size of from 40 to 100 mesh to form a colorant and then admixing said resultant colorant with said resin in an amount ranging from about 0.1% to about 10% by weight of the resin.

3. As a new composition of matter, the product produced in accordance with the method of claim 1.

References Cited in the file of this patent

UNITED STATES PATENTS

| | | |
|---|---|---|
| 2,040,818 | Baclollet | May 19, 1936 |
| 2,059,394 | Randolph | Nov. 3, 1936 |
| 2,472,680 | Pratt | June 7, 1949 |
| 2,649,382 | Vesce | Aug. 18, 1953 |
| 2,786,822 | Vesce | Mar. 26, 1957 |